March 31, 1959     D. H. WATKINS     2,879,608
TEST BOOKLET HAVING READILY ERASIBLE ANSWER SHEET
Filed April 10, 1956     2 Sheets-Sheet 1
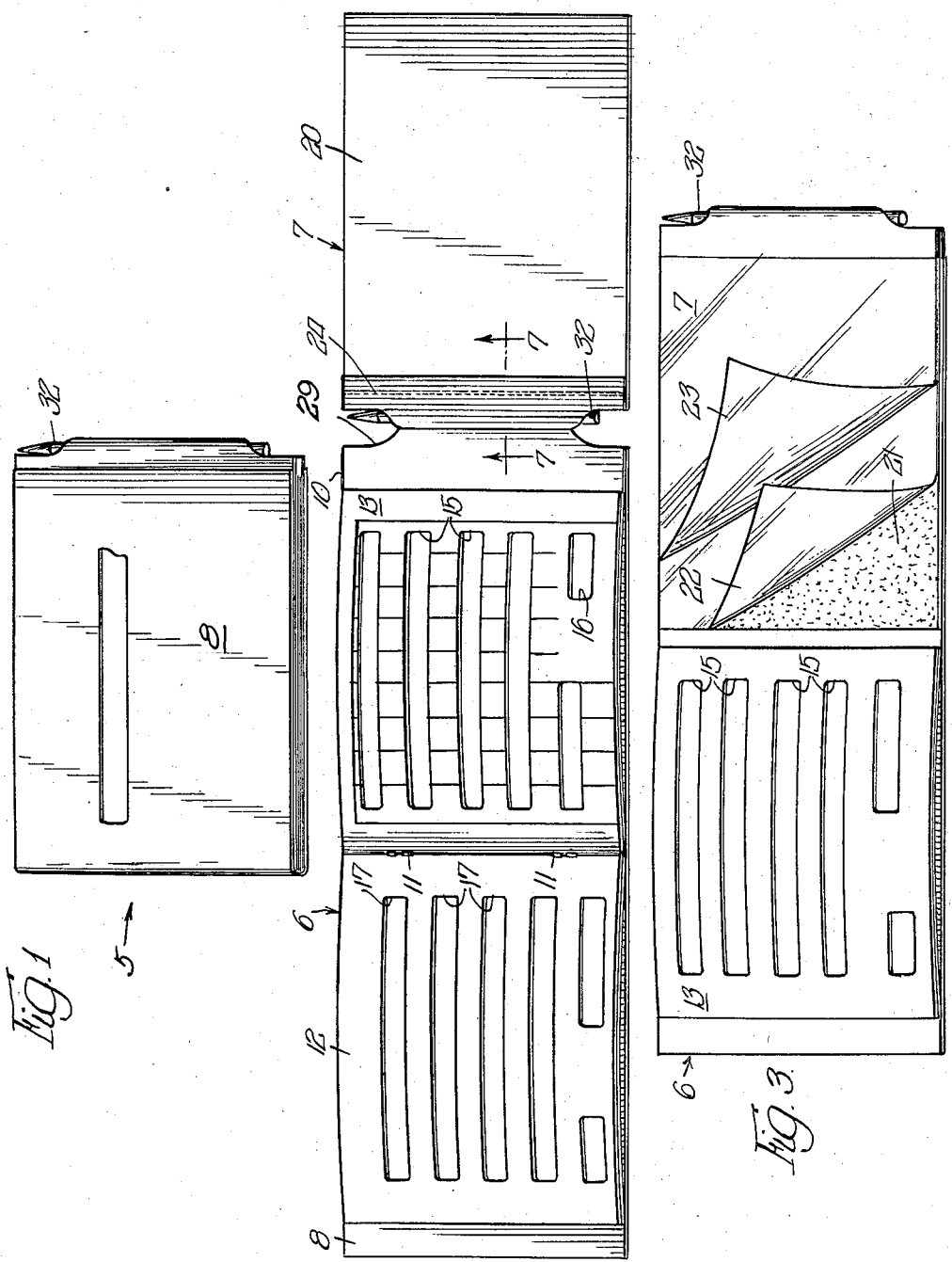
INVENTOR.
Daniel H Watkins
BY
Cromwell, Greist & Warden
Attys March 31, 1959     D. H. WATKINS     2,879,608
TEST BOOKLET HAVING READILY ERASIBLE ANSWER SHEET
Filed April 10, 1956     2 Sheets-Sheet 2
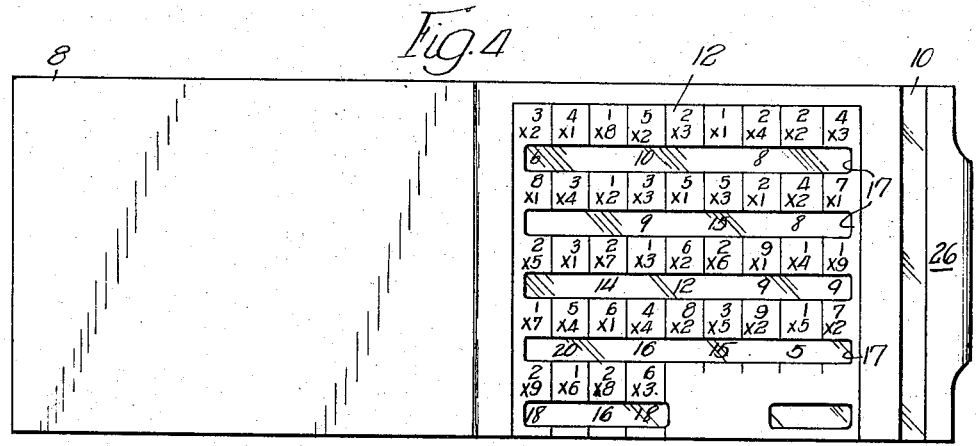
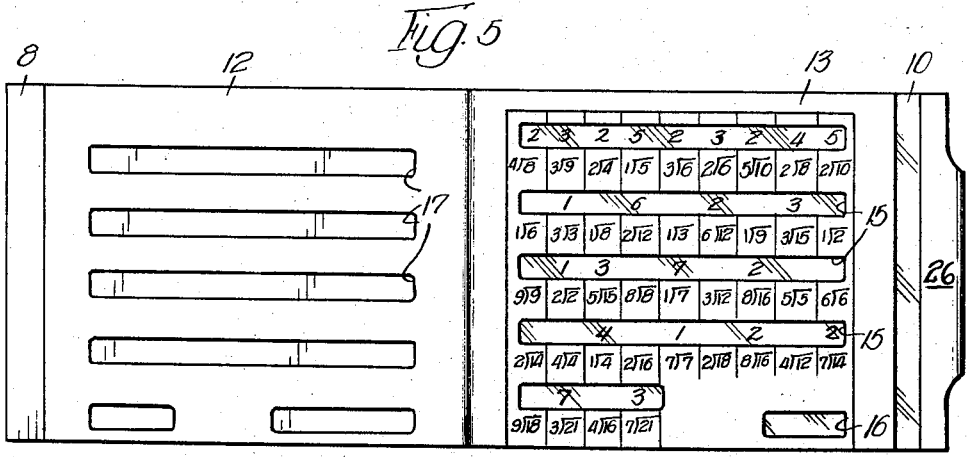
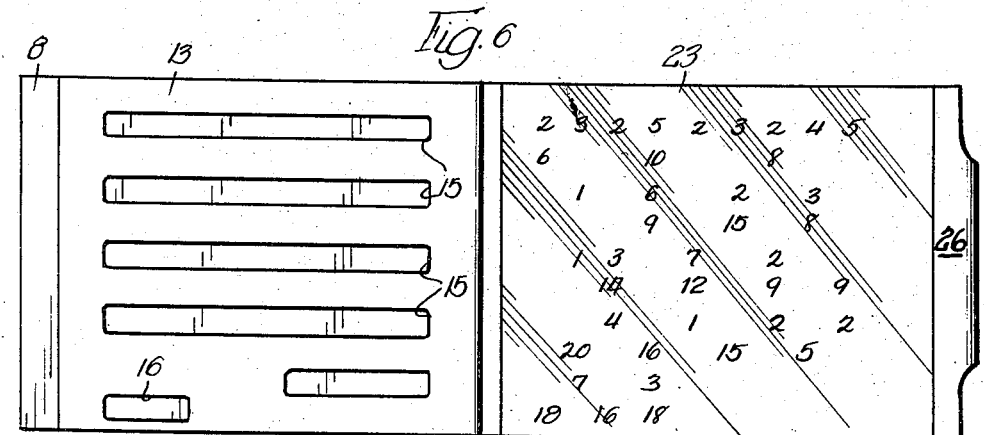
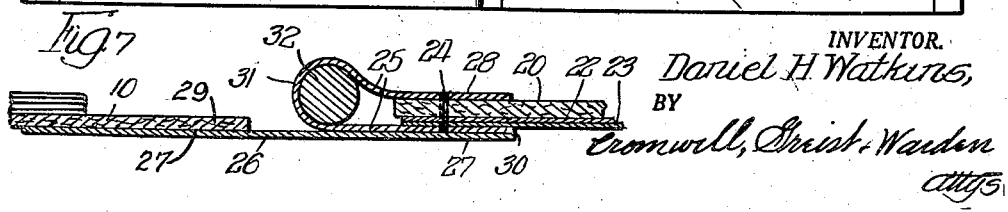
INVENTOR.
Daniel H Watkins,
BY
Cromwell, Greist & Warden
attys United States Patent Office 2,879,608
Patented Mar. 31, 1959

2,879,608

TEST BOOKLET HAVING READILY ERASIBLE ANSWER SHEET

Daniel H. Watkins, Aurora, Ill., assignor, by mesne assignments, to The Watkins-Strathmore Company, Aurora, Ill., a corporation of Maryland Application April 10, 1956, Serial No. 577,387

2 Claims. (Cl. 35—31)

This invention relates to an educational device which may be regarded as an aid to the teaching of various subjects in school, particularly arithmetic. The invention relates, more particularly, to an educational device of the type mentioned comprising a book having pages provided with elongated slot openings paralleling rows of problems printed thereon, and hinged to one of the covers of the book a pad of the type adapted to receive temporary indicia made thereon by a non-mark depositing stylus. The combination is such that the pad may be folded, writing surface up, underneath the slotted pages so that the writing surface is exposed through the slot openings.

The object of the invention, generally stated, is the provision of an intriguing educational device which will stimulate the pupil's interest, particularly in the subject of arithmetic.

A further object of the invention is an educational device or teaching aid in the form of an activity book wherein answers to problems may be temporarily written down or recorded on a pad of the type which receives temporary written indicia made thereon by a non-mark depositing stylus, and wherein after the answers have been checked they may be made to disappear so that the pad is in condition for use over and over again. A particularly desirable feature of the invention is the provision of one embodiment wherein rows of problems and adjacent slot openings are so arranged in adjacent pages that the answers to problems on both pages may be recorded on a pad before the answers are made to disappear.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a top perspective view of an activity book constituting one embodiment of the invention;

Fig. 2 is a top perspective view of the book shown in Fig. 1 fully opened up;

Fig. 3 is a top perspective view similar to Fig. 2 but showing the writing pad folded over into its normal position over the back cover of the book and showing two of the plies of the writing pad being lifted up at one corner;

Fig. 4 is a top plan view showing the manner in which the book or article is used in connection with one of the pages of problems comprising the book;

Fig. 5 is another top plan view showing use of the activity book in connection with another page of problems;

Fig. 6 is a top plan view in which the pages of the book have been turned over on the front cover leaving exposed the writing surface of the pad having thereon the answers recorded during the use of the book as illustrated in Figs. 4 and 5; and Fig. 7 is a detail sectional view on enlarged scale taken on line 7—7 of Fig. 2.

Referring initially to Figs. 1–3, the educational device or activity book constituting one embodiment of the invention and illustrating the principles thereof, is indicated generally at 5 in Fig. 1. The article 5 consists principally of a book indicated generally at 6 in Figs. 2 and 3, and hinged thereto a writing pad of the type adapted to receive temporary indicia made thereon by a non-mark depositing stylus. The pad is indicated generally at 7 in Figs. 2 and 3.

Since it is one object of the invention to make the articles available widely at minimum cost, the book 6 will usually be provided with paperboard or cardboard front and back covers 8 and 10, respectively, which will carry attractive color printing and designs. One or any desired number of pages are bound in the book, usually by wire staples as indicated at 11—11 (Fig. 2). The two pages of the book which are shown in the drawings are indicated at 12 and 13. While two pages will suffice to illustrate the principles of the invention, it will be appreciated that any number of pages may be provided.

In the particular embodiment shown the pages are printed on the front sides only. Thus, as shown in Fig. 2 the rear or back side of page 12 is blank whereas the front side of page 13 is printed with rows of division problems as shown in Fig. 5, in this particular instance. The rear or back side of page 13 is blank as shown in Fig. 3. The front side of page 12 is printed with rows of multiplication problems as shown in Fig. 4. However, problems of addition or subtraction could be used just as well.

Referring now to the top or front side of page 13 which is shown in both Figs. 2 and 5, it will be seen that a slot opening 15 extends along the top of each of the rows of division combinations. Shorter slot openings are indicated at the bottom of the page, one being indicated in the lower right-hand corner and designated as 16 for use of the teacher in grading the particular page.

The page 12 as shown in Fig. 4 is likewise provided with slot openings 17—17 extending beneath and adjacent to the rows of multiplication combinations. As illustrated in Figs. 2, 4 and 5 the slot openings 17 for page 12 do not register with the slot openings 15 for page 13. Rather, the slot openings 17 are aligned in registry with the solid portions of page 13 on which are printed the rows of division problems. Likewise, the slot openings 15 in page 13 are in registry with the solid portions of page 12 which carry the multiplication combinations. The purpose of this offset or non-registering relationship of the slot openings in adjacent pages will be made fully apparent hereinafter.

In order to complete the description of the article 5 and make known fully the manner in which it functions, the temporary writing pad 7 will now be described. Such a pad in and of itself is a known item and described in several expired patents, for example, Deutsch Patent No. 1,555,642, dated September 29, 1925, and Paasche Patent No. 2,074,855 dated March 23, 1937. Referring primarily to Figs. 2 and 3, it will be seen that the pad 7 comprises a stiff backing member 20 which may be suitably formed out of paperboard or cardboard, the reverse side of which is shown in Fig. 2. The front side or top side of the backing member 20 is coated with a dark-colored (usually black) impressionable or pressure-sensitive material, usually of a waxy nature, as indicated at 21 in Fig. 3. Immediately overlying the surface 21 is a thin, pliable translucent film 22 which is light-colored (usually white). This film may suitably be formed of a lightly pigmented film of rubber hydrochloride (e.g. "Pliofilm"). In order to protect the surface of the thin film 22 and thereby extend the life of the pad 7, it is customary to provide a second sheet or film 23 which is formed of a clear transparent material somewhat tougher and heavier than the film 22. Cellulose acetate or cellophane may be used for the protective film 23. The films 22 and 23 are secured by stitching or other means along one edge to the backing member 20, such stitching being indicated in the reverse side at 24 in Fig. 2.

The stitching 24 constitutes one element of the combined binder and hinging means for hinging the pad 7 to the outer edge of the back cover 10 of the book 6. This hinged construction is shown in detail in Fig. 7. The back cover 10 of the book is provided with an integral extension 29 (Fig. 2) which projects out from the adjacent edge and which is joined to the backing member 20 of the pad 7 by means of a piece of flexible material 26. A piece of flexible material 25 is looped over on itself and its opposite ends 28 and 30 fit over the opposite sides of the pad 7 as shown in Fig. 7. The stitching 24 serves to secure this arrangement together and bind the ends 28 and 30 and the films 22 and 23 along that edge of the pad 7. The loop 31 formed by the material 25 serves as a holder for a wooden stylus 32. The flexible hinge 26 is adhesively secured to the underside of the extension 29 and also to the underside of the loops 31 and end 30 as indicated at 27—27.

While other hinge arrangements may be utilized for connecting the pad 7 to the cover, the particular hinge arrangement illustrated in the drawings is a preferred one for a number of reasons, particularly, ease of assembly on a quantity production basis at low unit cost.

Having described the construction of the educational device or activity book 5, the manner in which it is used will now be described. While the particular order of working the problems on the different pages is not important, assume that it is desired to first work the multiplication problems on page 12 and thereafter work the division problems on page 13. Accordingly, the pad 7 is folded underneath the page 12 and above the top of page 13 so as to occupy the relationship brought out in Fig. 4. The user then proceeds to work the problems and fill in the answers in the slots 17 as shown.

When all of the answers to the problems on page 12 have been worked, page 12 is turned over on the front cover as shown in Fig. 5 and the pad 7 is folded, writing surface up, under page 13. The slots 15 in page 13 now overlie blank areas on the pad 7 while the solid strip portions of page 13 which carry the problems overlie the answers which have been recorded on the pad 7 for the problems on page 12. The user now proceeds to record in the slots 15 the answers to the division problems. The teacher may now take up the workbook 5 and expose the top or writing surface of the pad 7 as shown in Fig. 6 with all of the answers having been recorded thereon. The rows of answers are alternately for the multiplication and division problems as will be noted. After the answers have been corrected, then they are erased by simply lifting the films 22 and 23 from the impression surface 21 of the backing member. When the films are again smoothed out on the backing member, the pad will be clear or blank and ready for reuse.

Since certain changes in design and of a detailed nature may be made in the construction described above and shown in the accompanying drawings without departing from the spirit and scope of the invention, the foregoing disclosure is intended to be interpreted as illustrative and not in a limiting or restricted sense.

What is claimed as new is:

1. An educational device of the class described comprising, a book having a cover and at least two pages each having at least one row of problems printed thereon with an adjacent slot opening in each page extending along one side of said row, said rows of problems and said slot openings being parallel and said slot openings in adjacent pages being offset, a writing pad of the type adapted to receive temporary writing and marking made thereon by a non-mark depositing stylus, and hinge means connecting said pad along one edge to one edge of said book cover whereby said pad may be folded writing side up underneath said slotted pages so that the pad can be exposed through said slot openings.

2. An educational device of the class described comprising a book having a cover and at least two pages each having parallel rows of arithmetic problems printed thereon with an adjacent slot opening extending along one side of each row, said slot openings in adjacent pages being offset, a writing pad of the type adapted to receive temporary indicia made thereon by a non-mark depositing stylus and comprising a relatively stiff backing member having a dark-colored impressionable upper surface and an overlying impression sheet formed of light-colored translucent pliable film bound to one edge of said backing member, and hinge means connecting said pad along one edge to one edge of said cover whereby said pad may be folded writing side up under each slotted page so that the pad writing surface is exposed through said slots and answers to the adjacent rows of problems in adjacent pages may be recorded on said pad through said non-registering openings in adjacent pages.

References Cited in the file of this patent

UNITED STATES PATENTS

| | | |
|---|---|---|
| 1,510,110 | Schmidt | Sept. 30, 1924 |
| 1,617,657 | Studebaker | Feb. 15, 1927 |
| 1,750,977 | Thompson | Mar. 18, 1930 |
| 2,074,855 | Paasche | Mar. 23, 1937 |
| 2,213,225 | Maggioni | Sept. 3, 1940 |
| 2,455,353 | Bell | Dec. 7, 1948 |

FOREIGN PATENTS

| | | |
|---|---|---|
| 512,794 | Great Britain | Sept. 26, 1939 |